Oct. 1, 1957 E. H. WAYCHOFF 2,808,258
HORIZONTAL LOOPER FOR STRIP-PROCESSING LINE
Filed Jan. 25, 1954 2 Sheets-Sheet 1
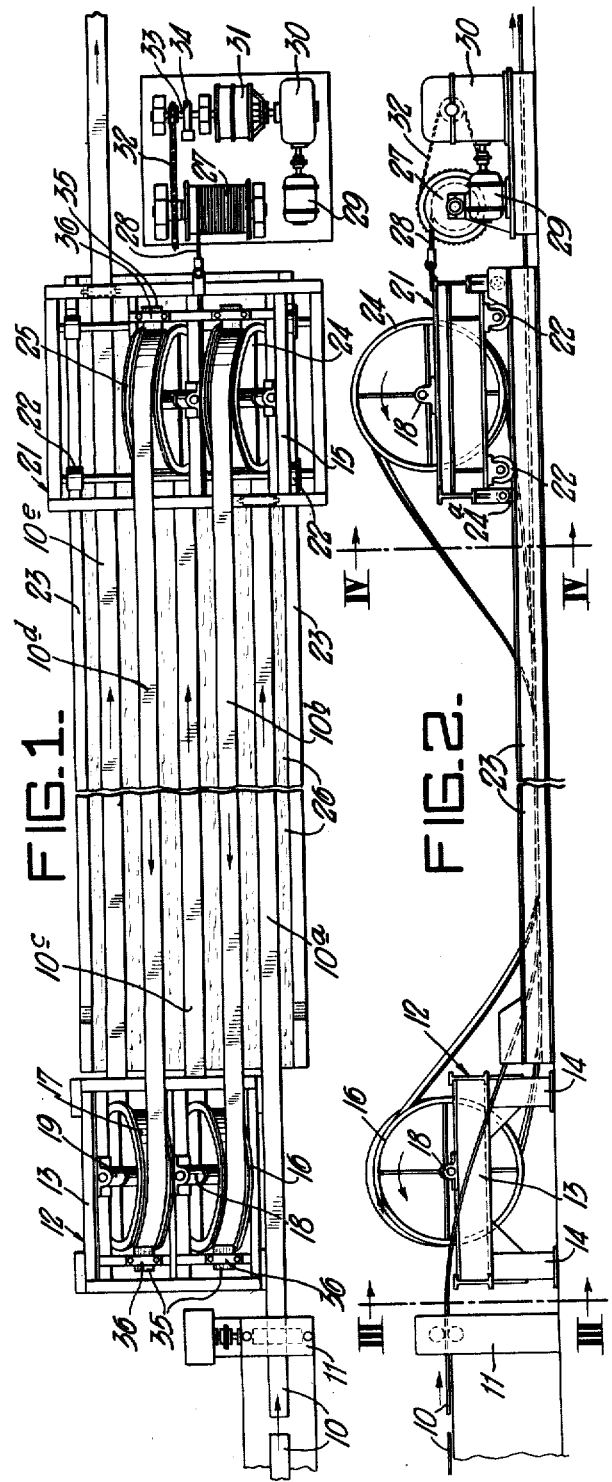
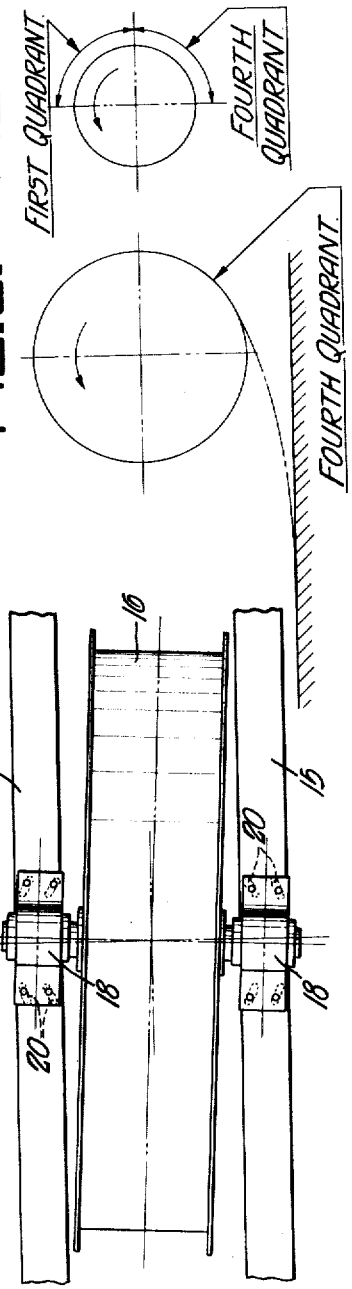
Inventor:
EVERETT H. WAYCHOFF,
by: Donald G. Dalton
his Attorney

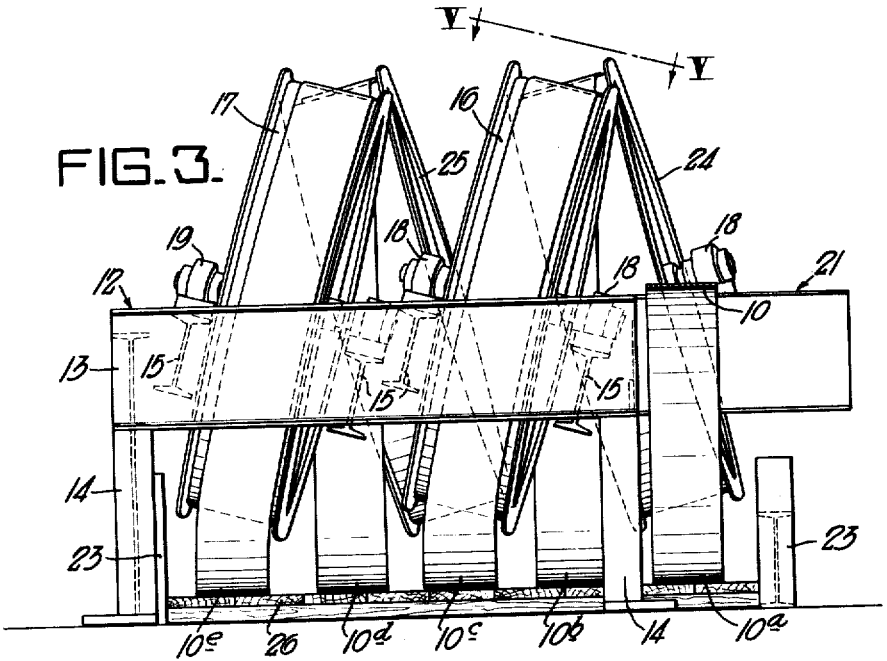
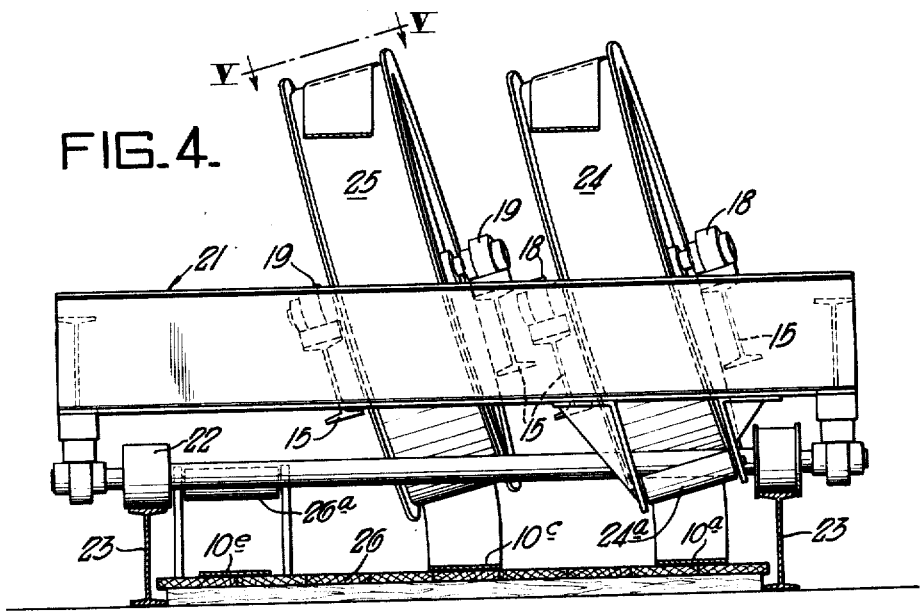

United States Patent Office 2,808,258
Patented Oct. 1, 1957

2,808,258

HORIZONTAL LOOPER FOR STRIP-PROCESSING LINE

Everett H. Waychoff, Gary, Ind., assignor to United States Steel Corporation, a corporation of New Jersey Application January 25, 1954, Serial No. 405,750

3 Claims. (Cl. 271—2.2)

This invention relates to a looper for accumulating surplus in a length of material, e. g., steel strip, being treated continuously in a straightaway line of apparatus, to permit the attachment of the leading end of each successive coil to the trailing end of the preceding coil without stopping the travel of the strip through the apparatus.

Strip loopers of various types have been developed as an incident to the growth of continuous processing of steel strip. The vertical looper is most commonly employed. It requires a pit or well sunk into the ground and a tower extending upwardly over the pit. The tower, however, interferes with the overhead traveling crane customarily installed in industrial plants. Horizontal loopers have also been devised but those with which I am familiar are subject to the objection that they permit adjacent strands of strip to come in contact thereby damaging the strip edges, unless disappearing strip-supporting devices are employed. The latter are costly and difficult to maintain. Damage to strip edges cannot be tolerated in certain strip-processing operations such as continuous electric tube welding.

I have invented a novel horizontal looper which effectively maintains separate and out of contact, the multiple strands of strip in which the necessary surplus length is disposed until needed, without requiring special separating elements. In a preferred embodiment, I provide fixed and traveling sheave cages disposed horizontally and means for mounting sheaves therein so that a length of strip trained around them will progress along predetermined, separate paths in traveling from a sheave in one cage to a sheave in the other. The sheaves in one cage are canted in one direction and those in the other cage in the opposite direction and each sheave, furthermore, is adjustable about an axis normal to the plane containing the sheave axis and a horizontal line normal thereto, whereby the strip tracks smoothly from one sheave to the next. Suitable drive means are provided to retract the traveling cage and lengthen the loops after the latter have been shortened and the traveling cage thereby advanced toward the fixed cage in paying out the stored surplus length.

A complete understanding of the invention may be obtained from the following detailed description and explanation which refer to the accompanying drawings illustrating the present preferred embodiment. In the drawings, Figure 1 is a plan view;

Figure 2 is a side elevation;

Figure 3 is an end elevation with parts omitted, showing the strip in section along the plane of line III—III of Figure 2;

Figure 4 is a transverse section along the plane of line IV—IV of Figure 2 with parts in elevation;

Figure 5 is a partial view from above such as would be projected on planes V—V of Figures 3 and 4, with the strip omitted; and Figures 6 and 7 are diagrams for the purpose of explanation.

Referring now in detail to the drawings and, for the present, the Figures 1 through 5, my improved looper is adapted to receive strip 10 from a stand 11 of conventional pinch rolls. Ahead of the pinch rolls are preferably installed an uncoiler, a cropping shear and an end-to-end welder of known construction (not shown). At the entrance end of the looper and preferably adjacent the pinch-roll stand is a fixed sheave cage 12 comprising a horizontal rectangular frame 13 supported on posts 14. Frame 13 includes, in addition to side rails and end rails, a plurality of intermediate parallel beams 15 disposed in spaced pairs and normal to the plane containing the axes of the pinch rolls. As shown in Figure 3, the beams 15 of the two pairs, respectively, lie in parallel planes inclined to the plane of frame 13, in the direction transversely of the path of the strip 10. Flanged strip-guiding sheaves 16 and 17 are journaled in bearings 18 and 19 carried by the beams of the two pairs, respectively.

The bearings 18 and 19 are secured to beams 15 by bolts and the flanges of the beams have arcuate slots 20 therein for the bolts whereby the sheaves may be angularly adjusted to a limited extent by pivotal movement about an axis normal to the sheave axis and a horizontal line therethrough. Thus the sheaves 16 and 17 are not only canted relative to the horizontal plane in which frame 13 lies, but are turned slightly so that planes normal to their axes are inclined at a small angle to the beams 15.

A sheave cage 21 normally spaced from cage 12 is generally similar to the latter except that, instead of posts 14, it has rollers 22 on which it is adapted to travel toward and from cage 12 on spaced side rails 23 parallel to the side rails of frame 13. Cage 21 is provided with sheaves 24 and 25 mounted in the same way as sheaves 16 and 17 but oppositely canted as indicated in Figure 3. A looping floor or table 26, preferably of wood sheathing extends the length of rails 23 and covers the full space therebetween, affording a skidway for the several strands of strip extending between the sheaves in cage 12 and those in cage 21.

As clearly shown in the drawings, the strip 10 delivered to the looper by pinch rolls 11 travels forwardly on floor 26 at one side thereof in a strand or loop 10a. The strip then passes upwardly around sheave 24 thence downwardly to the floor and returns along the latter in a reverse strand 10b to cage 12 where it travels upwardly over sheave 16 then downwardly to the floor and again forwardly therealong in a strand 10c. At cage 21, the strip travels upwardly around sheave 25 and thence down to the floor and rearwardly in a reverse strand 10d. Finally the strip passes upwardly around sheave 17 and then downwardly to the floor and forwardly therealong, past cage 21 to the continuous processing apparatus (not shown). The latter, of course, includes means for applying the traction necessary to draw the strip through the looper. A guide roller 24a depending below cage 21 directs loop 10a onto sheave 24 and a similar roller 26a at the exit end of floor 26 holds the outgoing strip down out of contact with the cage.

It will be apparent that the looper described provides a maximum surplus length of strip of about four times the initial distance between the cages. As this surplus is drawn through the processing apparatus while the strip entering the looper is arrested for the attachment of a new coil, strands 10a, 10b, 10c and 10d are shortened and this pulls cage 21 along rails 23 toward cage 12. When the attachment of the succeeding coil has been effected, cage 21 is retracted to restore the shortened strands or loops to their full length. For this purpose a drum or reel 27 has a pull-back cable 28 wound thereon and attached to the traveling cage.

Winding torque is exerted on drum 27 by a motor 29 through a gear reducer 30, a clutch 31 and a chain-and-sprocket drive 32. A jack shaft 33 receives the output of the gear reducer through clutch 31. An electro-magnetic brake 34 on the jack shaft normally holds the latter stationary. Motor 29 runs constantly and, under normal conditions, clutch 31 is de-energized while shaft 33 is held against rotation by brake 34. When a new coil is to be attached, brake 34 is released permitting cable 28 to unwind from drum as cage 21 moves toward cage 12. When the coil has been attached, clutch 31 is energized causing drum 27 to rewind cable 28 and retract cage 21. When the cage has reached its extreme limit of travel, i. e., the position shown in the drawings, clutch 31 is disengaged and brake 34 is applied. The brake and clutch may be automatically controlled by the operation of the welder and cage 21 through suitable interlock contacts, limit switches and relays.

During periods of mill shut-down, it is desirable to restrain the tendency of the strip to spring away from the sheaves. This may be effected by hardwood retainer blocks 35 (see Figure 1). The blocks are held in position by clamps 36 secured to beams 15 of the cages 12 and 21, respectively, and located on the outer side of the sheaves. Preferably a gap of approximately 1½" is left between the sheave face and the edge of the retainer block.

The diameters and degree of inclination of the sheaves are such that the bottom of sheave 24 is in the path of travel of the incoming strip, i. e., strand 10a, and the top of sheave 24 is in alinement with the top of sheave 16 in cage 12, along the path of travel of strand 10b (see Figure 3). Similarly, the bottom of sheave 16 is alined with the bottom of sheave 25 (loop 10c) and the top of sheave 25 with the top of sheave 17 (loop 10d). The bottom of sheave 17 is in line with the path of loop 10e as it travels toward the mill or other processing apparatus. The paths of the several strands of strip between the sheaves and along the looper floor are substantially parallel thus avoiding any contact, overlapping or interference therebetween. In normal operation, all strands of the strip between the cages, because of their weight, slide on the floor of the looper without crossing one another or riding one upon the other. The slack loops or strands, of course, are pulled up into catenaries as the surplus strip is payed out of cage 21 pulled toward cage 12. Since the strip, because of its own weight, either slides along floor 23 or hangs in a catenary between the spaced sheaves, the point at which the strand 10a engages the face of the sheave 24 is at a point beyond the bottom face of the sheave, as shown in Figure 6.

As viewed in Figure 2, sheaves 24 and 25 always rotate counter-clockwise and the point of contact of the incoming strip with the face of the sheave is always in the fourth quadrant (see Figure 7). From Figure 4, it will be noted that any given point on the face of the sheave as it moves into the fourth quadrant will move upward and to the left. This action, unless corrective measures were taken, would cause the incoming strip to bind against the lower flange of the sheave. By adjusting the position of the sheave slightly about an axis in the vertical plane and perpendicular to the sheave shaft as shown in Figures 4 and 5, the point of contact of the face of the sheave with the strip is moved to the left (Figure 4) to a lesser degree so that the incoming strip, in seating itself on the face of the sheave, does not scuff or bind against the lower sheave flange.

The sheaves 16 and 17 in cage 12 are likewise angularly adjusted about an axis which is in the vertical plane and perpendicular to the sheave shaft. Thus, as the sheaves revolve in the counter-clockwise direction a point on the face of the sheaves as it progresses through the second quadrant (Figure 7), has a horizontal component to the left as viewed in Figure 3. This horizontal component causes the strip as it rides onto sheaves 16 and 17 to ride "uphill" and away from the lower side flange of the sheaves. The strip thereby enters the top of sheaves 16 and 17 without binding or scuffing against the lower flange of sheave 25.

The total reserve footage available to the mill or processing line downstream from the looper is equal to the maximum distance through which the carriage can travel multiplied by the number of free strands. In the illustrated embodiment, four strands of strip may be regarded as surplus or free strands. A greater number of strands may be maintained by increasing the number of sheaves in each cage.

The diameter of the sheaves must be greater than the diameter of a free circle of curvature which the heaviest strip to be handled can assume without taking a permanent set. The degree of inclination of the sheaves is in turn determined by the sheave diameter and the maximum width of strip to be handled, to assure non-impingement or interference of one strip with another on the looping floor. It has been determined in practice that the angle of inclination of the sheave should not exceed 15° otherwise it becomes increasingly difficult to cause the strip to track on the sheave face without scuffing the sheave flange. The proper angle of adjustment of the sheave bearings about an axis perpendicular to the sheave axis and a horizontal line therethrough has been found to be about ⅕ of the degree of inclination of the sheave from the vertical. If this angle is larger, then there is danger of the strip riding the opposite flange.

As a specific example of my invention, a certain electric-weld tube will will normally handle from 9⅝" x .148" thick strip to make 3" O. D. tube, down to 3⅜" x .049" to make 1¼" O. D. tubes. The cage 21 of the looper used therewith has two sheaves and a 75-foot travel which, with four free strands of strip gives a maximum of 300' surplus strip length. The strip sheaves are 54" face diameter with a 12" width of face with a 2" flange placing the parallel strands on 14" centers. The angle of inclination of the sheaves from the vertical is 15°. The angle of rotation of the sheaves on beams 15 is 3°. At a mill speed of 60 F. P. M. the looper provides five minutes for end-welding one coil to the next.

As stated the geometry of the 54"-diameter sheave and the 15° angle of inclination results in a center-to-center distance of 14" between adjacent strands on the looper floor 26. This allows sufficient running clearance for 9⅝" wide strip having a camber not exceeding ½" in 20 ft., to travel free on the looper floor without contact between or damage to the edges of adjacent strands. Strip widths less than 9⅝", of course, have greater running clearance on the looper floor with this same combination of sheave diameter and angle of inclination.

In general, as the maximum width of strip to be handled is decreased and the maximum strip thickness remains unchanged it is desirable to decrease the angle of inclination of the sheave from the vertical and to reduce the angle of rotation on the mounting rails. If, for example, the maximum width of strip to be handled were 5", the angle of inclination of the sheaves could then be decreased to 10° and the angle of rotation to 2°. The center-to-center distance between adjacent strands on the looper floor would then become 9⅜". It follows, therefore, from the foregoing specific examples that, within the usual working ranges of my looper, a change of 1° in the angle of inclination of the strip sheaves will produce an average change of approximately 1⁵⁄₁₆" in the distance between the centerlines of adjacent strip strands on the looper floor.

It will be apparent that the improved looper of my invention has numerous advantages. It is simple in construction and easy to maintain. It operates with little or no attention and provides a plurality of strands of surplus strip which always remain separate and apart from each other without spacer elements or means. In addition, binding or scuffing of the strip edges on the sheave flanges is effectively prevented by the angular adjustment of the sheaves.

Although I have disclosed herein the preferred embodiment of my invention, I intend to cover as well any change or modification therein which may be made without departing from the spirit and scope of the invention.

I claim:

1. A strip looper comprising a fixed cage, a pair of horizontal rails adjacent one side of said cage, said rails extending in the direction away from said cage normal to the vertical plane containing said side, a second cage adapted to travel on said rails, sheaves journaled in said cages on axes extending transversely of said rails and making an acute angle with the horizontal, the sheaves in the fixed cage being canted one way from the vertical and those in the second cage the other way, means mounting said sheaves in said cages for angular adjustment about a pivotal axis normal to the plane containing the sheave axis and a horizontal line normal thereto, and a horizontal skidway between said rails adapted to slidingly support strands of strip passing back and forth between said cages whereby the slack of strip trained successively around sheaves in the respective cages traverses spaced parallel runs therebetween on said skidway.

2. In apparatus for accumulating a surplus of strip length in a plurality of parallel horizontal runs, a fixed set of sheaves journaled side-by-side and canted sidewise in one direction, an elongated horizontal skidway extending straightaway from said sheaves, a cage traveling along said skidway toward and from said sheaves, means for moving said cage along said skidway, a plurality of sheaves journaled in said cage side-by-side and canted sidewise in the other direction, all said sheaves having their axes displaced at a slight angle from a vertical plane normal to the length of the skidway, said skidway serving slidably to support side-by-side in adjacent runs the slack of strip traveling successively around the sheaves of the fixed set and the sheaves of said cage.

3. In apparatus for accumulating surplus loops of strip traveling along a predetermined path, a rectangular frame disposed horizontally, a plurality of pairs of intermediate beams spaced across the width of the frame and parallel to said path, the beams of each pair lying in a plane inclined to the horizontal, opposed bearings carried by the beams of each pair, and a sheave having an axle journaled in the bearings of each pair of beams, said beams having arcuate slots therein on arcs of circles drawn about the midpoint of said axle, said bearings being bolted to said beams through said slots.

References Cited in the file of this patent

UNITED STATES PATENTS

| | | |
|---|---|---|
| 642,141 | Lyon | Jan. 30, 1900 |
| 1,085,396 | Allsop et al. | Jan. 27, 1914 |
| 1,842,946 | Prins | Jan. 26, 1932 |
| 2,133,109 | Munson | Oct. 11, 1938 |
| 2,153,376 | Kline | Apr. 4, 1939 |
| 2,202,127 | Tondreau | May 28, 1940 |

UNITED STATES PATENT OFFICE

CERTIFICATE OF CORRECTION

Patent No. 2,808,258                          October 1, 1957

Everett H. Waychoff

It is hereby certified that error appears in the printed specification of the above numbered patent requiring correction and that the said Letters Patent should read as corrected below.

Column 4, line 31, for "will", first occurrence, read -- mill --.

Signed and sealed this 19th day of November 1957.

(SEAL)
Attest:

KARL H. AXLINE
Attesting Officer

ROBERT C. WATSON
Commissioner of Patents